US012542953B2

United States Patent
Govindu et al.

(10) Patent No.: US 12,542,953 B2
(45) Date of Patent: Feb. 3, 2026

(54) SYSTEMS AND METHODS FOR ENABLING CELLULAR PROPERTIES IN SATELLITE SET TOP BOXES USING CELLULAR NETWORKS

(71) Applicant: DISH Network Technologies India Private Limited, Bengaluru (IN)

(72) Inventors: Rajesh Govindu, Karnataka (IN); PrasannaKumar L, Karnataka (IN); Srinidhi An, Karnataka (IN)

(73) Assignee: DISH Network Technologies India Private Limited, Karnataka (IN)

( * ) Notice: Subject to any disclaimer, the term of this patent is extended or adjusted under 35 U.S.C. 154(b) by 141 days.

(21) Appl. No.: 18/622,622

(22) Filed: Mar. 29, 2024

(65) Prior Publication Data

US 2025/0310615 A1    Oct. 2, 2025

(51) Int. Cl.
*H04N 21/61* (2011.01)
*H04N 21/414* (2011.01)

(52) U.S. Cl.
CPC ... *H04N 21/6131* (2013.01); *H04N 21/41407* (2013.01); *H04N 21/6143* (2013.01)

(58) Field of Classification Search
CPC ......... H04N 21/6131; H04N 21/41407; H04N 21/6143
See application file for complete search history.

(56) References Cited

U.S. PATENT DOCUMENTS

| 6,647,015 B2 * | 11/2003 | Malkemes | H04L 1/06 370/329 |
| 8,307,398 B2 * | 11/2012 | Matz | H04N 21/4227 725/62 |
| 2008/0305802 A1 * | 12/2008 | Barnes | H04L 12/2898 455/445 |

* cited by examiner

*Primary Examiner* — Mulugeta Mengesha
(74) *Attorney, Agent, or Firm* — Seed Intellectual Property Law Group LLP (57) ABSTRACT

A system for enabling cellular properties in a broadcast satellite Set Top Box (STB) using a cellular network. The system includes a satellite receiver, a cellular antenna, and a satellite receiver STB. The satellite receiver receives broadcast signals from a satellite. The broadcast signals includes an encapsulated video feed. The cellular antenna receives cellular signals from a cellular tower. The cellular antenna directs the cellular signals to a cellular chipset. The satellite receiver STB is associated with the satellite receiver and the cellular antenna. The satellite receiver STB includes a STB circuit board for processing the broadcast signals from the satellite receiver to present video feed received from the satellite and for processing cellular signals from a cellular tower. The satellite receiver STB is configured to transmit the broadcast signals to end user broadcast devices and transmit the cellular signals to end user cellular devices.

20 Claims, 9 Drawing Sheets

SYSTEMS AND METHODS FOR ENABLING CELLULAR PROPERTIES IN SATELLITE SET TOP BOXES USING CELLULAR NETWORKS

BACKGROUND

There is a growing desire to be able to watch enhanced video content with improved image detail, contrast, and color gamut, as well as listen to immersive audio with three-dimensional sound. Additionally, there is a desire for robust services on mobile devices such as OTA television service on phones, tables, and the like. Furthermore, on demand capabilities are limited by the lack of ability for two-way interaction. There is a continuing need for a system that provides enhanced audio and video capabilities as well as other advanced mobile services and features. The present disclosure addresses these and other needs.

BRIEF SUMMARY

The present disclosure relates to system for enabling cellular properties in a satellite network, and particularly to a system for enabling cellular properties in a satellite Set Top Box (STB) using a cellular network.

Briefly stated, embodiments described herein are directed towards a system for enabling cellular properties in a satellite STB using a cellular network. The system includes: a satellite receiver, a cellular antenna, and a satellite receiver STB associated with the satellite receiver and the cellular antenna. The satellite receiver receives broadcast signals from a satellite. The broadcast signals include an encapsulated video feed. The cellular antenna receives cellular signals from a cellular tower. The cellular antenna directs the cellular signals to a cellular chipset. The satellite receiver STB is configured to transmit the broadcast signals to end user broadcast devices. The satellite receiver STB includes a STB circuit board. The STB circuit board includes a satellite broadcast chipset for processing the broadcast signals from the satellite receiver to un-encapsulate the encapsulated video feed received from the satellite. The STB circuit board also includes the cellular chipset that is configured to process cellular signals from the cellular tower. The satellite receiver STB is configured to transmit the cellular signals to end user cellular devices.

In some embodiments of the system for enabling cellular properties in a satellite STB using a cellular network, the cellular signals from the cellular tower are 5G cellular signals. In another aspect of some embodiments, the cellular signals from the cellular tower provide cellular phone call support. In still another aspect of some embodiments, the cellular signals from the cellular tower provide cellular Internet support. In yet another aspect of some embodiments, the cellular signals from the cellular tower provide cellular SMS support. Furthermore, another aspect of some embodiments, the cellular SMS support provides emergency alert services.

In one or more embodiments of the system for enabling cellular properties in a satellite STB using a cellular network, the system further includes: a broadcast television remote with cellular functionality for call support. In another aspect of some embodiments, the end user devices include mobile devices and fixed devices. The mobile devices include one or more of smartphones, laptop computers, and the like. The fixed devices include one or more of Internet of Things (IOT) devices, televisions, desktop computers, and other fixed display devices. In still another aspect of some embodiments, the satellite broadcast chipset is in communication with the cellular chipset.

In other embodiments, one or more methods for enabling cellular properties in a broadcast satellite STB using a cellular network are disclosed. The method includes: receiving broadcast signals at a satellite receiver from a satellite, the broadcast signals including an encapsulated video feed; receiving cellular signals at a cellular antenna from a cellular tower; processing signals using a satellite receiver Set Top Box (STB) associated with the satellite receiver and the cellular antenna, wherein the satellite receiver STB includes a STB circuit board, the STB circuit board including a satellite broadcast chipset and a cellular chipset, wherein the satellite broadcast chipset processes the broadcast signals from the satellite receiver to un-encapsulate the encapsulated video feed received from the satellite, and the cellular chipset processes cellular signals from the cellular tower; and transmitting, using the satellite receiver STB, the broadcast signals to end user broadcast devices, and transmitting, using the satellite receiver STB, the cellular signals to end user cellular devices.

In some embodiments of the method for enabling cellular properties in a broadcast satellite STB using a cellular network, the cellular signals from the cellular tower are 5G cellular signals. In another aspect of some embodiments, the cellular signals from the cellular tower provide cellular phone call support. In still another aspect of some embodiments, the cellular signals from the cellular tower provide cellular Internet support. In yet another aspect of some embodiments, the cellular signals from the cellular tower provide cellular SMS support. Furthermore, in another aspect of some embodiments, the cellular SMS support provides emergency alert services.

In one or more embodiments of the method for enabling cellular properties in a broadcast satellite STB using a cellular network, the method further comprises: providing a broadcast television remote that includes cellular functionality for call support. In another aspect of one or more embodiments, the end user devices include one or more of mobile devices and fixed devices. The mobile devices include one or more of smartphones, laptop computers, and the like. The fixed devices includes one or more of Internet of Things (IOT) devices, televisions, desktop computers, and other fixed display devices. In still another aspect of one or more embodiments, the satellite broadcast chipset is in communication with the cellular chipset.

In still other embodiments, further embodiments described herein are directed towards a system for enabling cellular properties in a satellite set top box using a cellular network. The system includes: a satellite receiver, a cellular antenna, and a satellite receiver Set Top Box (STB) associated with the satellite receiver and the cellular antenna. The satellite receiver receives broadcast signals from a satellite. The broadcast signals include an encapsulated video feed. The cellular antenna receives cellular signals from a cellular tower. The cellular antenna directs the cellular signals to a cellular chipset. The satellite receiver STB includes a STB circuit board for processing the broadcast signals from the satellite receiver to un-encapsulate the encapsulated video feed received from the satellite and for processing cellular signals from a cellular tower. The satellite receiver STB is configured to transmit the broadcast signals to end user broadcast devices and transmit the cellular signals to end user cellular devices.

In some embodiments of the system for enabling cellular properties in a satellite STB using a cellular network, the cellular signals from the cellular tower are 5G cellular signals. In another aspect of some embodiments, the cellular signals from the cellular tower provide cellular phone call support. In still another aspect of some embodiments, the cellular signals from the cellular tower provide cellular Internet support. In yet another aspect of some embodiments, the cellular signals from the cellular tower provide cellular SMS support. Furthermore, another aspect of some embodiments, the cellular SMS support provides emergency alert services.

In one or more embodiments of the system for enabling cellular properties in a satellite STB using a cellular network, the system further includes: a broadcast television remote with cellular functionality for call support. In another aspect of some embodiments, the end user devices include mobile devices and fixed devices. The mobile devices include one or more of smartphones, laptop computers, and the like. The fixed devices include one or more of Internet of Things (IOT) devices, televisions, desktop computers, and other fixed display devices. In still another aspect of some embodiments, the satellite broadcast chipset is in communication with the cellular chipset.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Each of the features and teachings disclosed herein may be utilized separately or in conjunction with other features and teachings to provide a system for enabling cellular properties in STBs using a satellite network. Representative examples utilizing many of these additional features and teachings, both separately and in combination, are described in further detail with reference to the attached FIGS. 1-7. This detailed description is intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
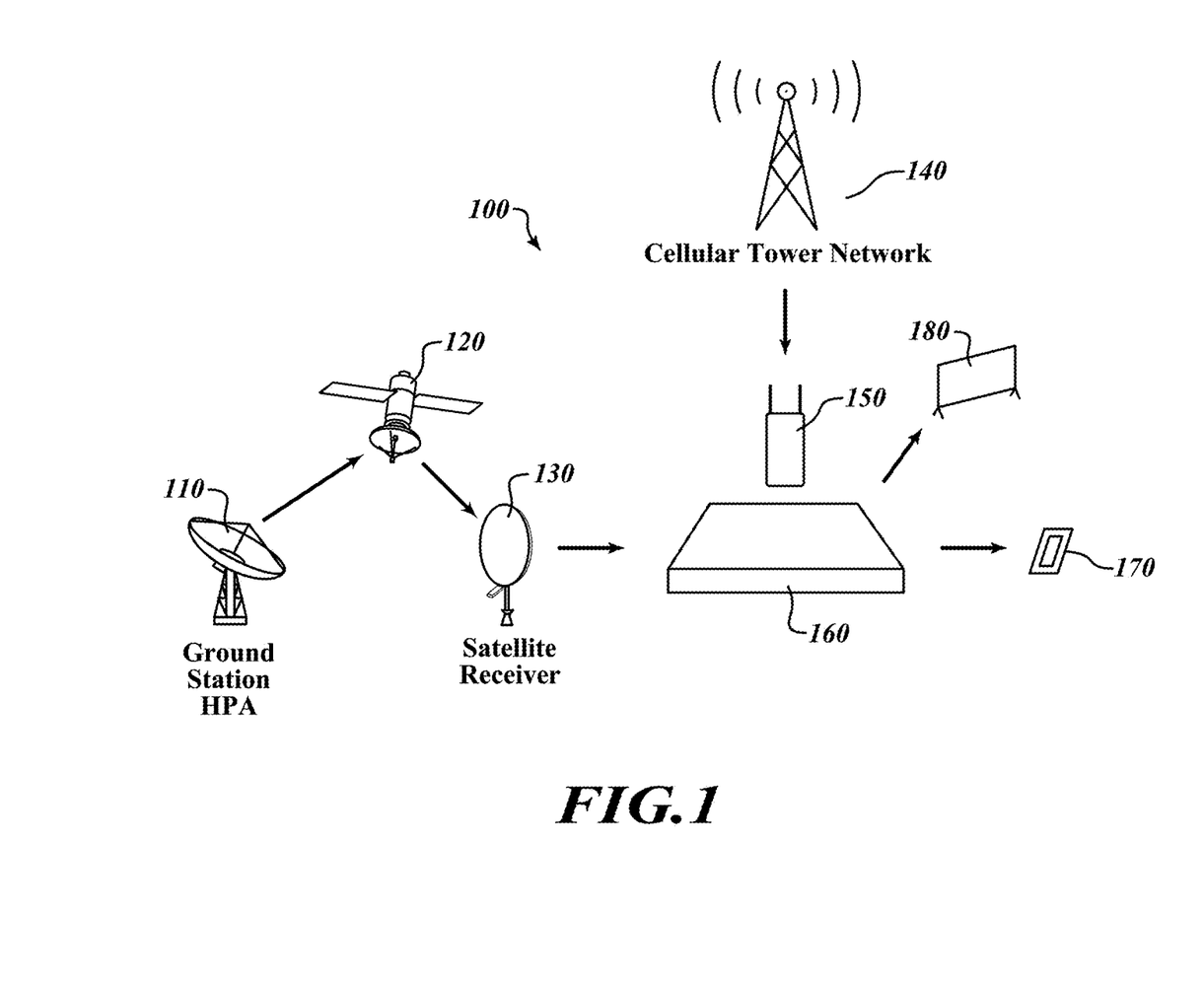
FIG. 1 is a system architecture diagram illustrating a system for enabling cellular properties in a satellite Set Top Box using a cellular network, according to one example embodiment.

As shown in FIG. 1, a system diagram is displayed for a system that enables cellular properties in a satellite Set Top Box using a cellular network. In one embodiment, the cellular network is a 5G cellular network. In other embodiments, the cellular network is 4G cellular network, a 6G cellular network, or other generation of cellular network. Specifically, the satellite-based content delivery system 100 includes a ground station High Power Amplifier (HPA) 110, a satellite 120, a satellite receiver 130, a cellular tower network 140, a cellular antenna 150, satellite Set Top Box (STB) 160, a cellular-enabled mobile device 170 (e.g., smartphone, laptop computer, etc.), and a broadcast enabled fixed device 180 (e.g., a television set, desktop computer, etc.). In one or more embodiments of the content delivery process, content may be encapsulated into a DVB packet structure and modulated onto a DVB-S2 carrier signal. In other embodiments, the content is not encapsulated and may be modulated in a different manner. During the content delivery process, the content is sent to the ground station HPA 110 where the signal is amplified to boost the signal level for uplink transmission to the satellite 120. The satellite 120 then sends the amplified signal to the satellite receiver 130. The satellite receiver 130 has a corresponding STB 160 for processing the received broadcast signals.

Additionally, as shown in FIG. 1, the cellular tower network 140 sends cellular signals to the cellular antenna 150. The cellular antenna 150 transmits the cellular signals to the satellite STB 160 for processing the received cellular signals. The satellite STB 160 includes a STB circuit board. The STB circuit board includes a satellite broadcast chipset for processing the broadcast signals from the satellite receiver 130 to un-encapsulate the encapsulated video feed received from the satellite 120. The STB circuit board also includes the cellular chipset that is configured to process cellular signals from the cellular tower 140. The satellite receiver STB 160 is configured to transmit the cellular signals to end user cellular devices 170. Additionally, the satellite receiver STB 160 is configured to transmit the broadcast signals to end user broadcast devices 180.

The end users then receive signals at their end user devices. For example, the end users receive the cellular signals via cellular-capable mobile devices 170 and receive the broadcast signals via broadcast-capable fixed devices 180. The end user devices include cellular mobile devices 170 such as smartphones, laptop computers, and the like. Additionally, the end user devices also include fixed broadcast-capable devices such as televisions, desktop computers, and other fixed display devices.

Figure 2A:
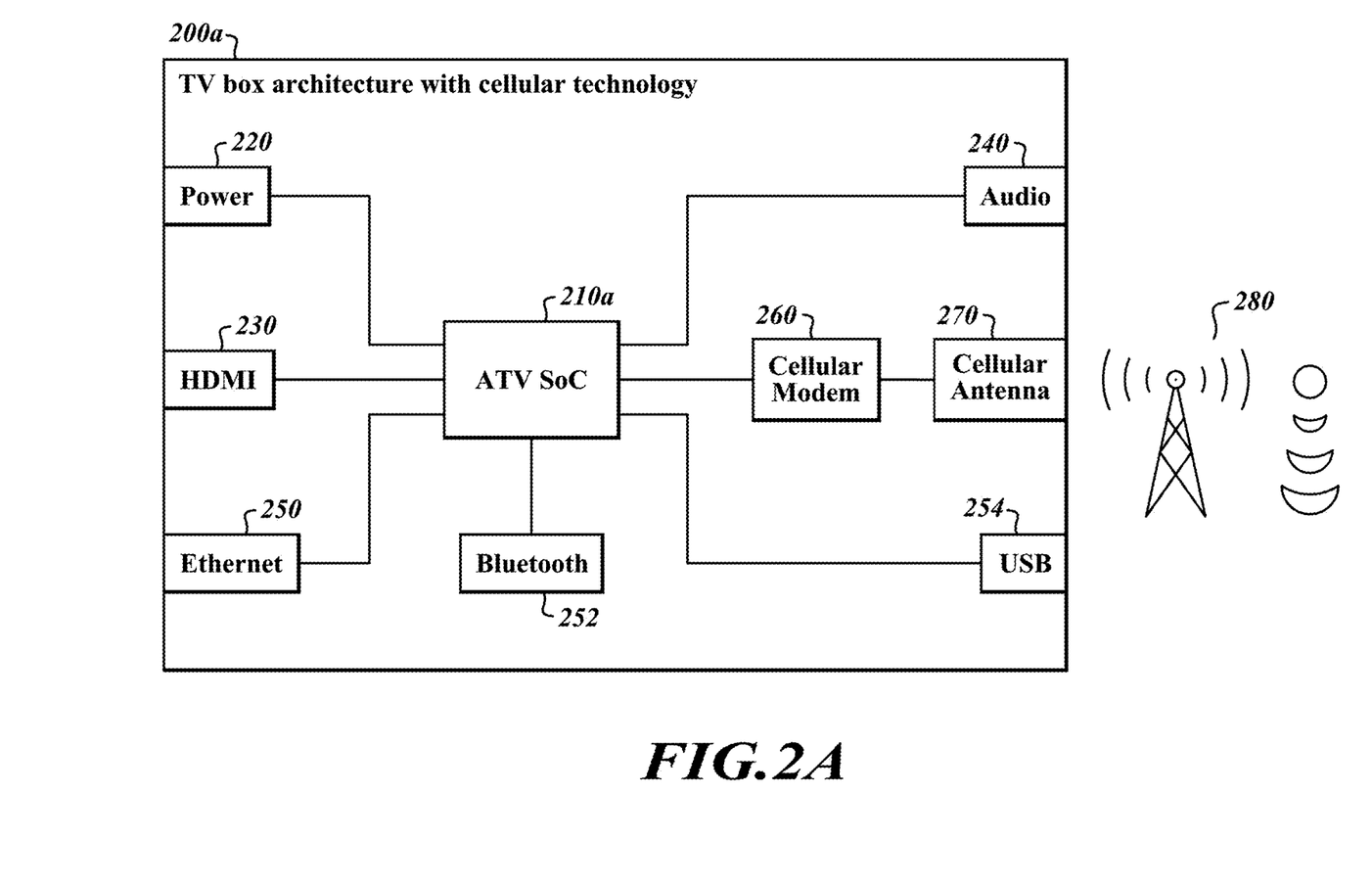
FIG. 2A is a system architecture diagram illustrating a system on a chip with a separate cellular modem for enabling cellular properties in a satellite Set Top Box using a cellular network, according to one example embodiment.

Referring now to FIG. 2A, a system architecture diagram is shown of a TV Box Architecture with Cellular Technology 200a for the satellite receiver STB 160 that includes a system on a chip (SoC) 210a with a separate cellular modem 260 for enabling cellular properties in a satellite STB using a cellular network. In some such embodiments, the TV Box Architecture with Cellular Technology 200 further includes power circuitry 220, High-Definition Multimedia Interface (HDMI) circuitry 230, audio circuitry 240, ethernet circuitry 250, Bluetooth circuitry 252, universal serial bus (USB) circuitry 254, a cellular modem 260, and cellular antenna circuitry 270. The power circuitry 220 controls the power for the satellite STB 160. The HDMI circuitry 230 processes the HDMI signals for the satellite STB 160. The audio circuitry 240 controls the audio for the satellite STB 160. The ethernet circuitry 250 controls the ethernet data transmissions for the satellite STB 160. The Bluetooth circuitry 252 controls the Bluetooth communications for the satellite STB 160. The USB circuitry 254 controls the USB data transmissions for the satellite STB 160. The cellular modem 260 controls the cellular transmissions (e.g., modulations and demodulations) for the satellite STB 160. The cellular antenna circuitry 270 controls the communications between the satellite STB 160 and the cellular tower network 280.

Figure 2B:
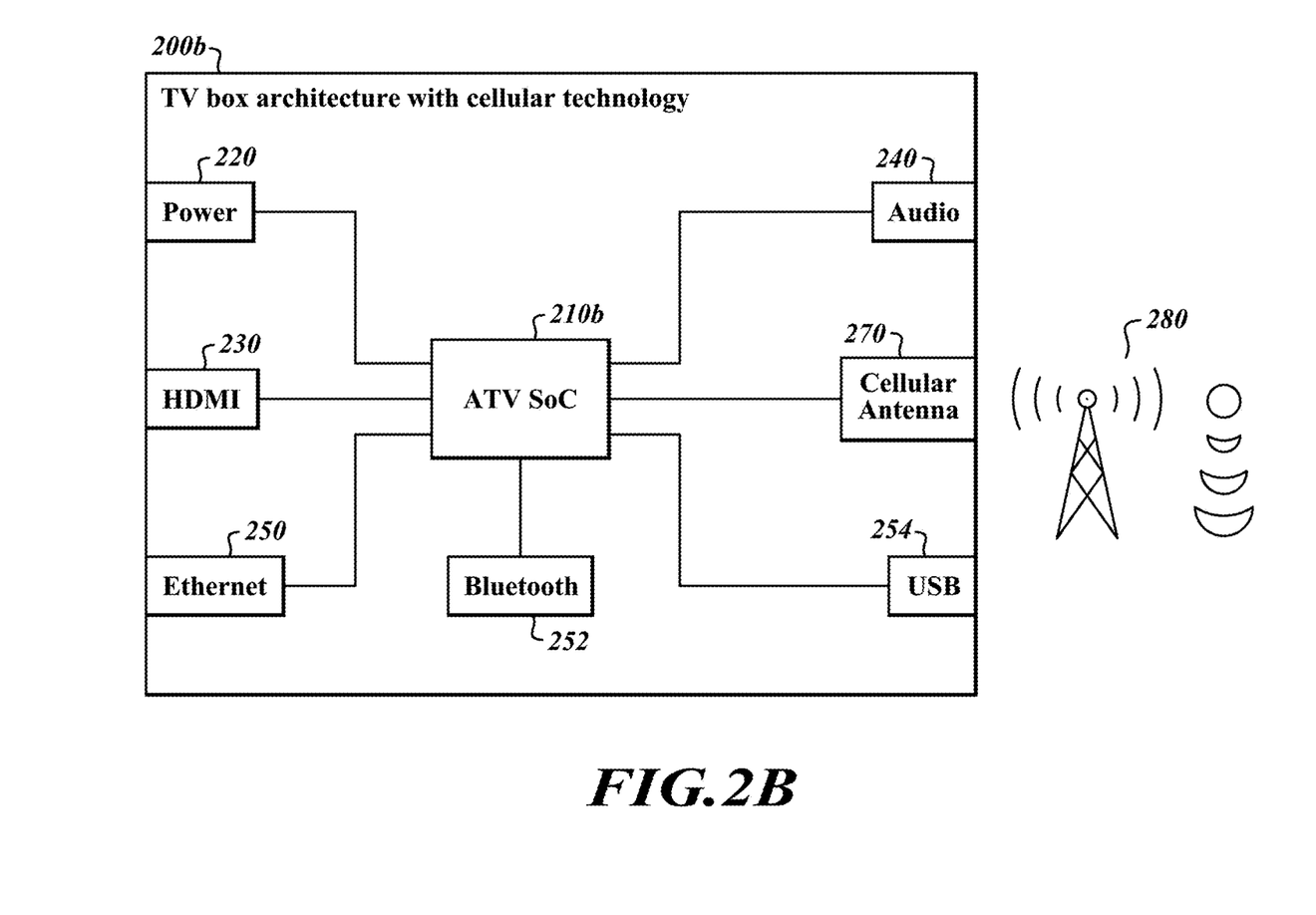
FIG. 2B is a system architecture diagram illustrating a system on a chip with an incorporated cellular modem for enabling cellular properties in a satellite Set Top Box using a cellular network, according to one example embodiment.

Referring now to FIG. 2B, a system architecture diagram is shown of a TV Box Architecture with Cellular Technology 200b for the satellite receiver STB 160 that includes a system on a chip (SoC) 210b with an incorporated cellular modem for enabling cellular properties in a satellite STB using a cellular network. In some such embodiments, the TV Box Architecture with Cellular Technology 200 further includes power circuitry 220, High-Definition Multimedia Interface (HDMI) circuitry 230, audio circuitry 240, ethernet circuitry 250, Bluetooth circuitry 252, universal serial bus (USB) circuitry 254, and cellular antenna circuitry 270. All of these components function in a similar fashion to the embodiments shown in FIG. 2A, except that the cellular modem 260 of FIG. 2A (which is separate from the system on a chip (SoC) 210a in FIG. 2A) has been incorporated into the system on a chip (SoC) 210b in FIG. 2B.

Figure 3:
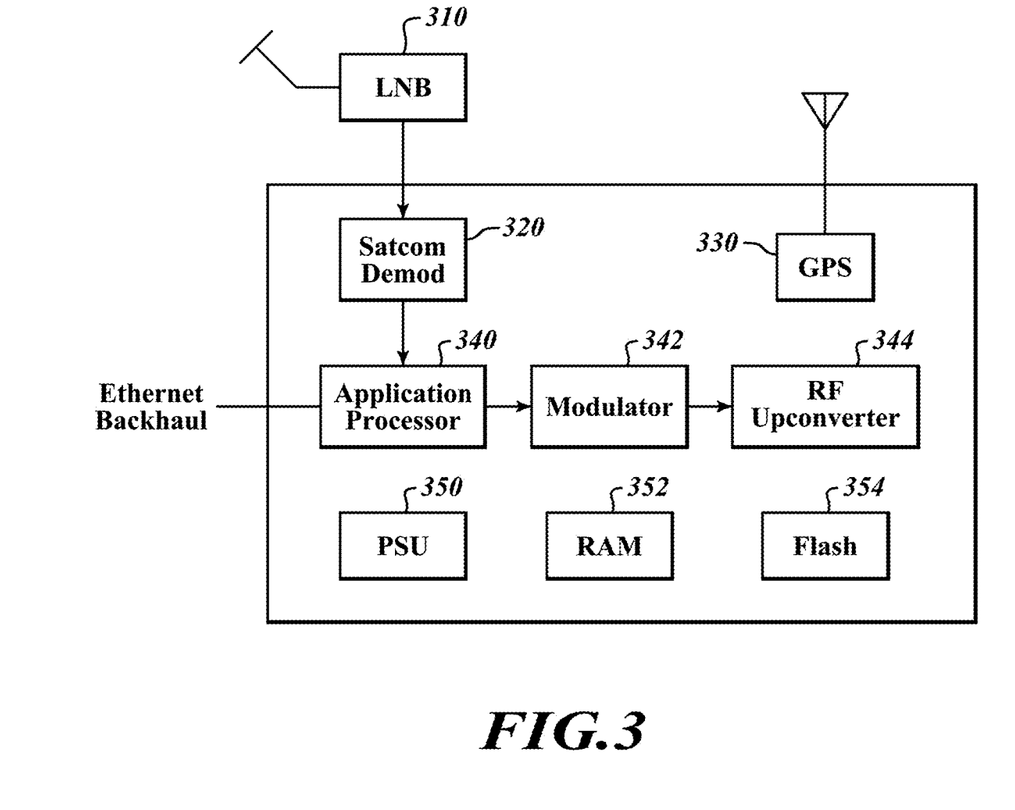
FIG. 3 is an architecture diagram illustrating a circuit board for enabling cellular properties in a satellite Set Top Box using a cellular network, according to one example embodiment.

Referring now to FIG. 3, in another aspect of one embodiment of a system for enabling cellular properties in a satellite STB, an architecture diagram of a circuit board is shown for receiving the satellite signals. In one or more embodiments, the architecture diagram includes Low-Noise Block Downconverter (LNB) 310 for receiving the satellite signals in a satellite-based content delivery system. The LNB 310 is the receiving device used for satellite TV reception. In some embodiments, the LNB 310 is operatively associated with a Satcom Demodulator 320, a Global Positioning System (GPS) 330, an application processor 340, a modulator 342, a Radio Frequency (RF) upconverter 344, a Power Supply Unit (PSU) 350, Random Access Memory (RAM) 352, Flash Memory 354.

Figure 4:
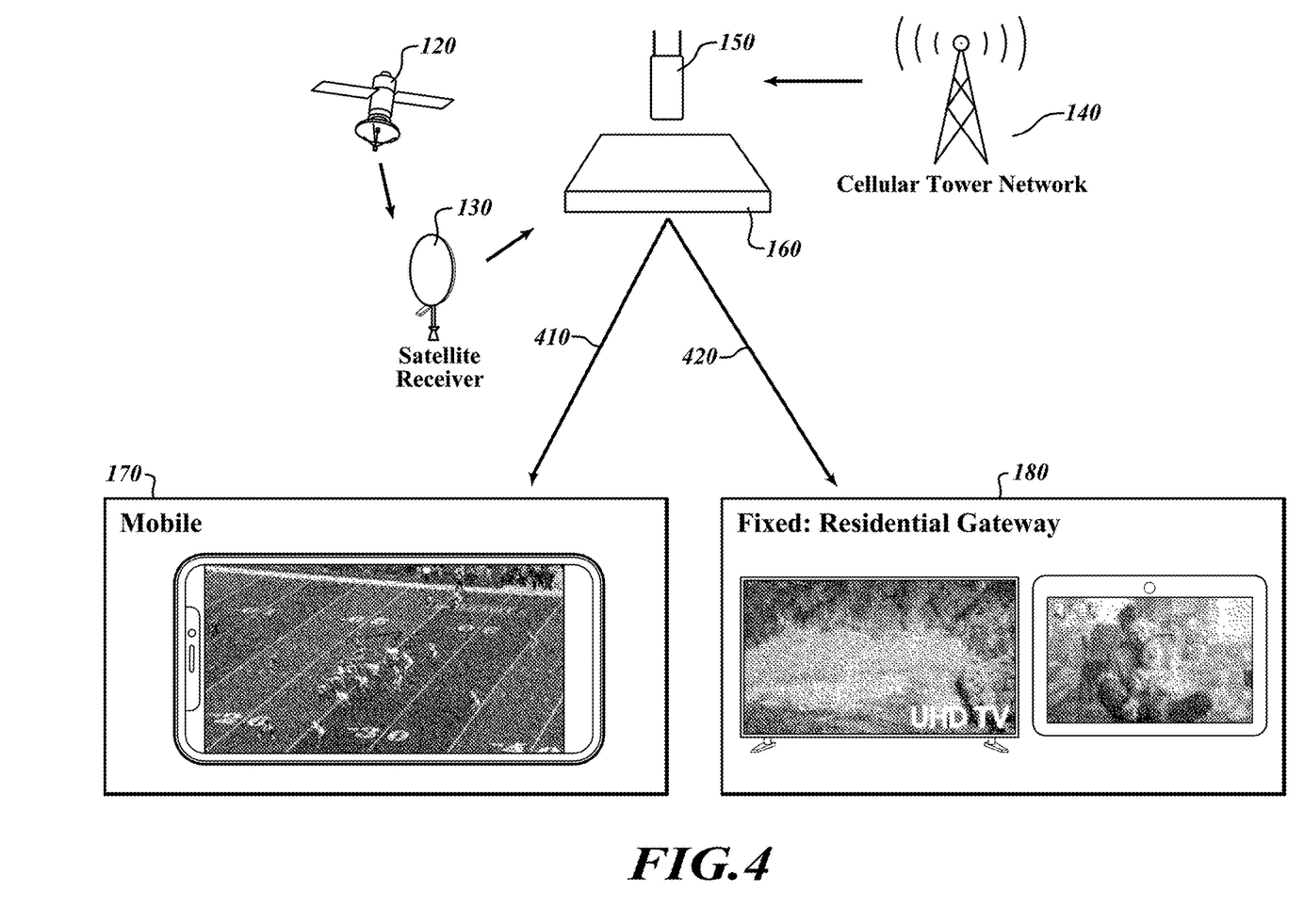
FIG. 4 is a system diagram illustrating a system for enabling cellular properties in a satellite Set Top Box using a cellular network, according to one example embodiment.

Referring now to FIG. 4, a system diagram is shown for enabling cellular properties in a satellite STB architecture using a satellite 120, a satellite receiver 130, a cellular tower network 140, a cellular antenna 150, and a satellite STB 160. Specifically, the satellite 120 send broadcast signals to the satellite receiver 130 that are processed by the satellite STB 160. Additionally, the cellular tower network 140 sends cellular signals to the cellular antenna 150 that are processed by the satellite STB 160. Next, the satellite STB 160 sends transmissions (e.g., RF waveforms) out to multiple end user receiving devices. Specifically, the satellite STB 160 sends transmissions 410 to mobile 5G cellular devices 170. These transmissions 410 include both broadcast signals to support broadcast enabled devices and cellular signals to support cellular enabled devices. Additionally, the satellite STB 160 sends transmissions 420 to fixed residential gateway devices 180. These transmissions 420 include both broadcast signals to support broadcast enabled devices and cellular signals to support cellular enabled devices. The transmissions 410 and 420 may be transmitted via one or more of WiFi, HDMI cables, or other transmission medium.

Figure 5A:
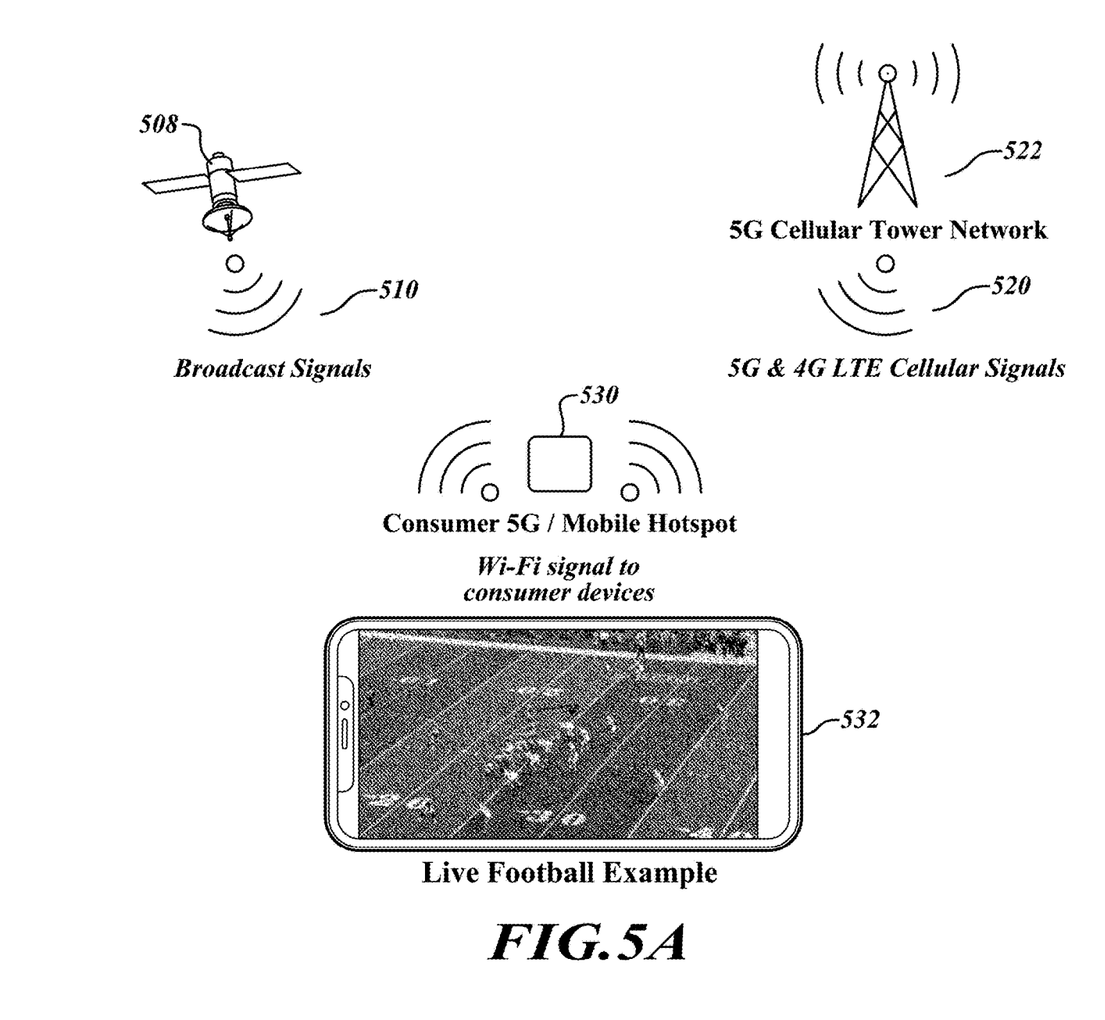
FIG. 5A is a system diagram illustrating a system with satellite broadcast network and a cellular network that connect to a combination cellular+satellite broadcast Mobile Hotspot, according to one example embodiment.

Referring now to FIG. 5A, an embodiment of a system for enabling cellular properties in a satellite STB broadcast architecture is shown with a satellite broadcast network 508 and a 5G cellular Tower Network 522 that connect to a combination 5G Cellular+mobile hotspot 530, which may be provided on a user's smart phone 532. FIG. 5A is one embodiment of FIG. 4 that is directed towards providing broadcast signals and cellular signals to a user's mobile cellular device, such as a user's smart phone 532. In one such embodiment, the combination 5G Cellular+mobile hotspot 530 is incorporated into the satellite STB 160. In another aspect, the user's smart phone 532 is an embodiment of the end user cellular devices 170. In one such embodiment of the system for enabling cellular properties in a satellite STB broadcast architecture, the broadcast signal 510 (e.g., MPEG TS video feed) is combined with 5G cellular signals 520 (from the 5G cellular network 522) in a combination 5G Cellular+mobile hotspot 530. The mobile hotspot 530 provides service for a user's smart phone 532, laptop computer (not shown), or other mobile computing device (not shown). In such an embodiment, both the satellite broadcast signal 510 and the 5G cellular signals 520 are sent from the mobile hotspot 530 to the end user devices 532.

In the embodiment shown in FIG. 5A, the mobile hotspot 530 is being used to support the viewing of a live football game on a satellite broadcast network 508. In some embodiments of the system for enabling cellular properties in a satellite STB broadcast architecture, embodiments provide Over-the-Air broadcast TV services in conjunction with 5G wireless cellular services. There are often potential service customers that are in need of a 5G mobile hotspot. In one or more embodiments of the system for enabling cellular properties in a satellite STB broadcast architecture, a combination 5G Cellular+mobile hotspot 530 is incorporated into the system.

The combination 5G Cellular+mobile hotspot 530 of the system for enabling cellular properties in a satellite STB broadcast architecture offers a unique, combined set of features, by leveraging the cellular capabilities. These enhanced features and technological capabilities include expanded signal coverage, faster download speeds, free live TV channels (e.g., prime time networks including 4K and mobile viewing content), on-demand video, apps, and data usage savings by offloading content from 5G cellular networks 522 onto networks 508. This data usage savings by offloading content is similar to how a customer saves 5G cellular data usage by connecting to a free Wi-Fi hotspot.

The disclosed embodiments of the system for enabling cellular properties in a satellite STB broadcast architecture that include a combination 5G Cellular+mobile hotspot 530, offer a mobile hotspot that simultaneously provides traditional cellular networks plus the broadcasting features of satellite STBs 160. Such broadcasting features of satellite STBs 160 include free HD local channels (e.g., ABC, CBS, FOX, NBC, etc.), 4K live and on-demand video, TV apps and widgets, and offload data usage from 5G network onto network (e.g., offline Netflix). Lastly, in some embodiments of the system for enabling cellular properties in a satellite STB broadcast architecture that include a combination 5G Cellular+mobile hotspot 530, the system supports new mobile services such as Offline Netflix or YouTube, where the connection to Netflix or YouTube is made using networks 508 rather than 5G cellular networks 522.

Figure 5B:
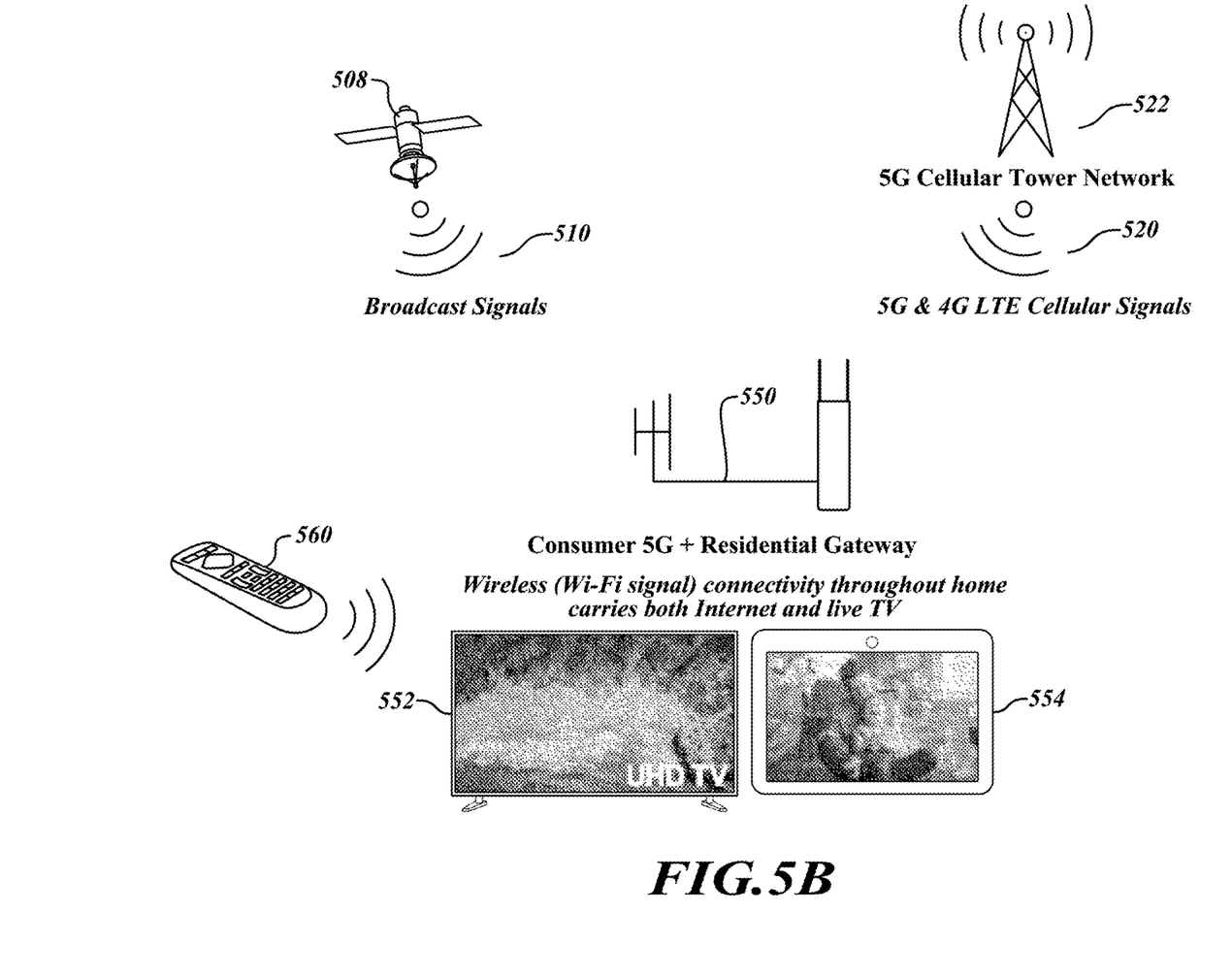
FIG. 5B is a system diagram illustrating a system with satellite broadcast network and a cellular network that connect to a combination cellular+satellite broadcast Residential Gateway, according to one example embodiment.

Referring now to FIG. 5B, an embodiment of a system for enabling cellular properties in a satellite STB broadcast architecture is shown with a satellite broadcast network 508 and a 5G cellular Tower Network 522 that connect to a combination 5G Cellular+Residential Gateway 550, such as a user's television devices 552 and fixed home computer 554. FIG. 5B is one embodiment of FIG. 4 that is directed towards providing broadcast signals and cellular signals to a user's residential device, such as a user's television devices 552 and fixed home computer 554. In one such embodiment, the combination 5G Cellular+Residential Gateway 550 is incorporated into the satellite STB 160. In another aspect, the user's television devices 552 and fixed home computer 554 are embodiments of the user's fixed devices 180. In one such embodiment of the system for enabling cellular properties in a satellite STB broadcast architecture, the satellite broadcast signal 510 (e.g., MPEG TS video feed) is combined with 5G cellular signals 520 (from a 5G cellular network 522) in a combination 5G+Residential Gateway 550. The Residential Gateway 550 provides fixed connectivity services for a user's television devices 552 and fixed home computer 554. In such an embodiment, both the satellite broadcast signal 510 and the 5G cellular signals 520 are sent from the Residential Gateway 550 to end user devices 552, 554.

Furthermore, in some embodiments, the system for enabling cellular properties in a satellite STB broadcast architecture includes a broadcast television remote 560 that has cellular functionality for troubleshooting call support. For example, the broadcast television remote 560 may include cellular modem 260 and cellular antenna circuitry 270 (as shown FIG. 2A) to provide the cellular functionality. In this manner, an end user device that was traditionally used as an input device for controlling broadcast television, may be enhanced to also enable cellular services such as placing phone calls. Accordingly, in some such embodiments, the system for enabling cellular properties in a satellite STB broadcast architecture includes a broadcast television remote 560 (as shown in FIG. 5B) having both broadcast circuitry and control systems, as well as cellular circuitry and control systems. Thus, the broadcast television remote 560 is able to use cellular functionality for call support, such as if the end user is having difficulty with viewing a channel or purchasing a Video On Demand movie or television program. Such cellular phone calls may further include troubleshooting calls, customer support calls, billing department call, calls to add services or content, emergency calls, and the like. Additionally, the cellular functionality may include support for SMS (short message service) text communications to facilitate assistance with the functions described above. In fact, in some embodiments, the full functionality of the broadcast television remote 560 could be incorporated into a customer's smart phone.

In another embodiment, the broadcast television remote 560 incorporates one or more of Bluetooth, Zigbee, or Wifi circuitry and control systems (instead of cellular circuitry) to wirelessly communicate with the STB, while the STB contains cellular functionality built therein, to communicate with other systems or individuals using cellular technology. Accordingly, the broadcast television remote 560 is able to initiate communication to the STB using Bluetooth, Zigbee, or Wifi, and the STB is able to continue the communication using cellular functionality to other cellular-enabled components or locations. Thus, after communication is initiated from the broadcast television remote 560 to the STB using one or more of Bluetooth, Zigbee, or Wifi, the STB then uses cellular functionality for the next stage of the communication with respect to call support, e.g., the end user is having difficulty viewing a channel, the end user is having difficulty purchasing a Video On Demand movie or television program, troubleshooting calls, customer support calls, billing department call, calls to add services or content, emergency calls, and the like. This system configuration is able to utilize a broadcast television remote 560 with fewer hardware requirements than some of the embodiments discussed above that required both broadcast circuitry and control systems, as well as cellular circuitry and control systems in the broadcast television remote.

Furthermore, in some embodiments, the broadcast television remote 560 acts as an "emergency alert" in a senior living environment (e.g., "help, I've fallen, and I can't get up"). While some senior adults may refuse to wear an emergency pendent or bracelet in case of falls or other emergencies, many seniors will have no objection to keeping a television remote control in their hand or in their immediate vicinity. Thus, the broadcast television remote 560 with incorporated emergency cellular services may act as a substitute for an emergency pendent or bracelet that the seniors would otherwise refuse to wear.

In the embodiment shown in FIG. 5B, the Residential Gateway 550 is being used to support the viewing of live television on the satellite broadcast network 508 as well as 5G cellular network 522 on end user devices 552, 554. In some embodiments of the system for enabling cellular properties in a satellite STB broadcast architecture, embodiments provide Over-the-Air broadcast TV services in conjunction with 5G wireless cellular services. Such services include enabling customers to have a 5G residential gateway for fixed wireless access Internet. The combination 5G Cellular+residential gateway 550 of the system for enabling cellular properties in a satellite STB broadcast architecture offers users who need fixed wireless Internet access, a unique, combined set of features, by leveraging the capabilities. These enhanced features and technologies include expanded signal coverage, faster download speeds, free live TV channels from prime time networks including 4K and mobile viewing content, on-demand video, apps, and data usage savings by offloading content from 5G cellular networks 522 onto satellite broadcast networks 508. This data usage savings by offloading content is similar to how a customer saves data usage whenever the connect to a free Wi-Fi hotspot.

The disclosed embodiments of the system for enabling cellular properties in a satellite STB broadcast architecture that include a combination 5G Cellular+residential gateway 550, offer a connectivity solution that simultaneously provides 5G Cellular fixed wireless access plus the broadcasting features of satellite STBs 160. Again, as described above, such broadcasting features of satellite STBs 160 include free HD local channels (ABC, CBS, FOX, NBC, etc.), 4K live and on-demand video, TV apps and widgets, and offload data usage from 5G cellular network 522 onto network 508 (e.g., offline Netflix).

Figure 6:
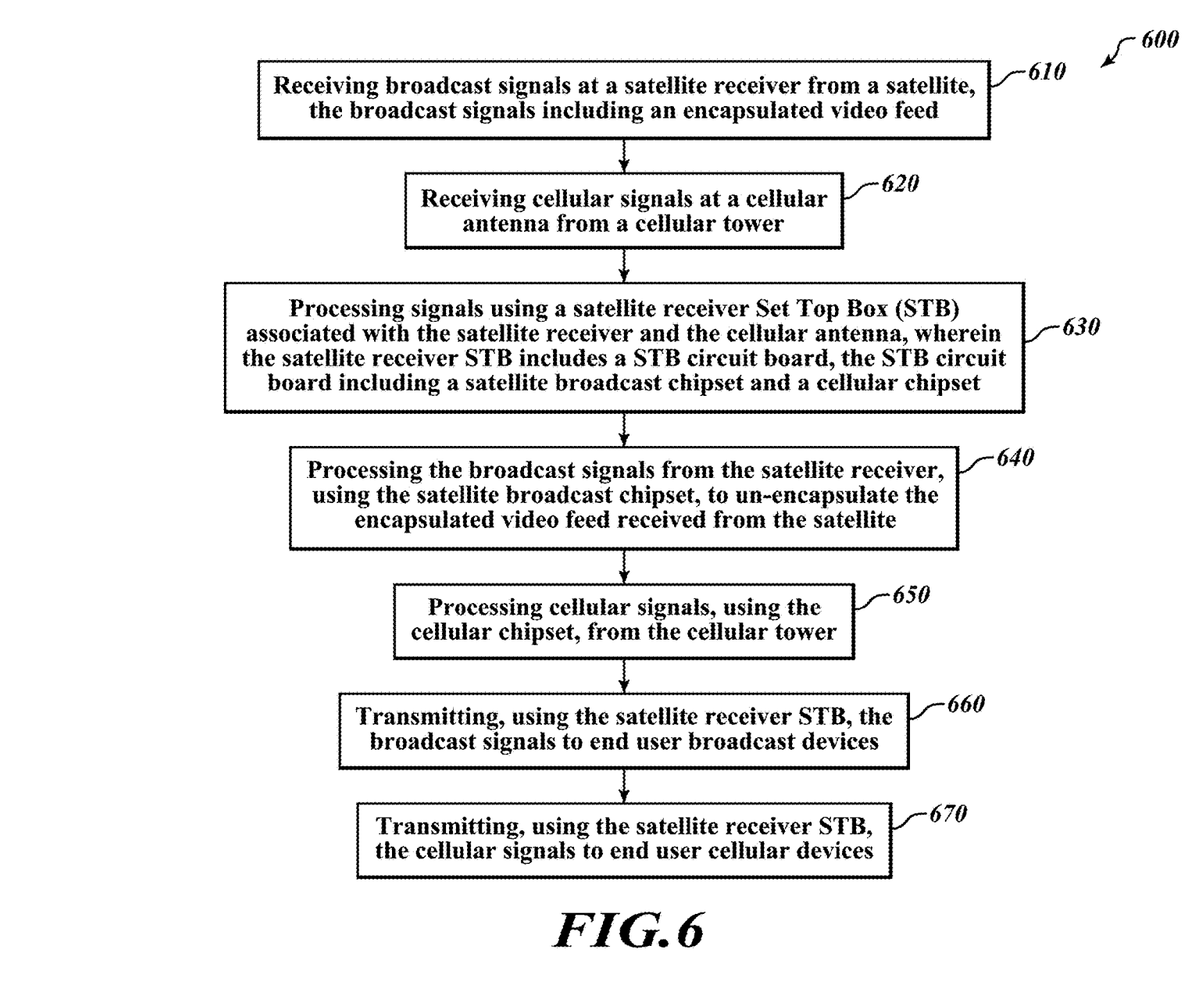
FIG. 6 is a logic diagram showing a method for delivery of an enabling cellular properties in Set Top Boxes using a cellular network.

FIG. 6 is a logic diagram showing a method 600 for enabling cellular properties in STBs using a 5G network. In some embodiments, the method 600 is employed in a satellite STB 160. As shown in FIG. 6, at operation 610, the method includes receiving broadcast signals at a satellite receiver from a satellite, the broadcast signals including an encapsulated video feed. At operation 620, the method includes receiving cellular signals at a cellular antenna from a cellular tower. At operation 630, the method includes processing signals using a satellite receiver STB associated with the satellite receiver and the cellular antenna, wherein the satellite receiver STB includes a STB circuit board, the STB circuit board including a satellite broadcast chipset and a cellular chipset. At operation 640, the method includes processing the broadcast signals from the satellite receiver, using the satellite broadcast chipset, to un-encapsulate the encapsulated video feed received from the satellite. At operation 650, the method includes processing cellular signals, using the cellular chipset, from the cellular tower. At operation 660, the method includes transmitting, using the satellite receiver STB, the broadcast signals to end user broadcast devices. At operation 670, the method includes transmitting, using the satellite receiver STB, the cellular signals to end user cellular devices.

Figure 7:
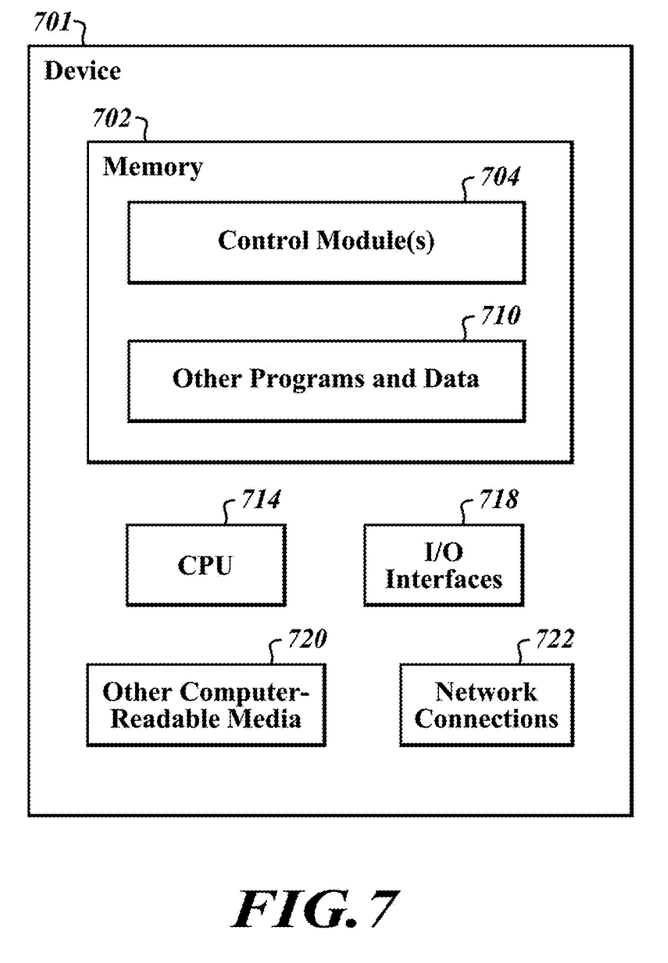
FIG. 7 shows a system diagram that describes an example implementation of a computing system(s) for implementing embodiments described herein.

FIG. 7 shows a system diagram that describes an example implementation of a computing system(s) for implementing embodiments described herein. The functionality described herein relates to a system for enabling cellular properties in STBs using a 5G network that can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility.

In particular, shown is an example host computer system 701, such as a satellite STB 160. For example, such a computer system 701 may represent those in various data centers and cell sites shown and/or described herein that host the functions, components, microservices, and other aspects described herein to implement enabling cellular properties in STBs using a 5G network. In some embodiments, one or more special-purpose computing systems may be used to implement the functionality described herein. Accordingly, various embodiments described herein may be implemented in software, hardware, firmware, or in some combination thereof. Host computer system 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for enabling cellular properties in STBs using a 5G network. Memory 702 may also store other programs and data 710, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands, and data to implement the processes described herein. I/O interfaces 718 may include a video interface, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for enabling cellular properties in a broadcast satellite Set Top Box (STB) using a cellular network, the system comprising:
   a satellite receiver that receives broadcast signals from a satellite, the broadcast signals including an encapsulated video feed;
   a cellular antenna that receives cellular signals from a cellular tower, the cellular antenna directing the cellular signals to a cellular chipset;
   a satellite receiver STB associated with the satellite receiver and the cellular antenna, the satellite receiver STB configured to transmit the broadcast signals to end user broadcast devices, wherein the satellite receiver STB includes a STB circuit board, the STB circuit board including:
      a satellite broadcast chipset for processing the broadcast signals from the satellite receiver to un-encapsulate the encapsulated video feed received from the satellite; and
      the cellular chipset for processing cellular signals from the cellular tower; and
   wherein the satellite receiver STB is configured to transmit the cellular signals to end user cellular devices.

2. The system of claim 1, wherein the cellular signals from the cellular tower are 5G cellular signals.

3. The system of claim 1, wherein the cellular signals from the cellular tower provide cellular phone call support.

4. The system of claim 1, wherein the cellular signals from the cellular tower provide cellular Internet support.

5. The system of claim 1, wherein the cellular signals from the cellular tower provide cellular SMS support.

6. The system of claim 5, wherein the cellular SMS support provides emergency alert services.

7. The system of claim 1, further comprising a broadcast television remote that includes cellular functionality for call support.

8. The system of claim 1, wherein the end user devices include:
mobile devices including one or more of smartphones, tablet computers, and laptop computers, and
fixed devices including one or more of Internet of Things (IOT) devices, televisions, desktop computers, and other fixed display devices.

9. The system of claim 1, wherein the satellite broadcast chipset is in communication with the cellular chipset.

10. A method for enabling cellular properties in a broadcast satellite STB using a cellular network, the method comprising:
receiving broadcast signals at a satellite receiver Set Top Box (STB), via a satellite receiver, from a satellite, the broadcast signals including an encapsulated video feed;
receiving cellular signals at the satellite receiver STB, via a cellular antenna, from a cellular tower;
processing signals using the satellite receiver STB associated with the satellite receiver and the cellular antenna,
wherein processing the signals includes processing the broadcast signals from the satellite receiver to un-encapsulate the encapsulated video feed received from the satellite, and processing the cellular signals from the cellular tower;
transmitting, using the satellite receiver STB, the broadcast signals to an end user broadcast device, and
transmitting, using the satellite receiver STB, the cellular signals to an end user cellular device.

11. The method of claim 10, wherein the cellular signals from the cellular tower are 5G cellular signals.

12. The method of claim 10, wherein the cellular signals from the cellular tower provide cellular phone call support.

13. The method of claim 10, wherein the cellular signals from the cellular tower provide cellular Internet support.

14. The method of claim 10, wherein the cellular signals from the cellular tower provide cellular SMS support.

15. The method of claim 14, wherein the cellular SMS support provides emergency alert services.

16. The method of claim 10, further comprising: providing a broadcast television remote that includes cellular functionality for call support.

17. The method of claim 10, wherein the end user device includes one or more of:
mobile devices including one or more of smartphones, tablet computers, and laptop computers, and
fixed devices including one or more of Internet of Things (IOT) devices, televisions, desktop computers, and other fixed display devices.

18. The method of claim 10, wherein the satellite broadcast chipset is in communication with the cellular chipset.

19. A system for enabling cellular properties in a broadcast satellite STB using a cellular network, the system comprising:
a satellite receiver that receives broadcast signals from a satellite, the broadcast signals including an encapsulated video feed;
a cellular antenna that receives cellular signals from a cellular tower, the cellular antenna directing the cellular signals to a cellular chipset; and
a satellite receiver Set Top Box (STB) associated with the satellite receiver and the cellular antenna, wherein the satellite receiver STB includes a STB circuit board for processing the broadcast signals from the satellite receiver to un-encapsulate the encapsulated video feed received from the satellite and for processing cellular signals from a cellular tower,
wherein the satellite receiver STB is configured to transmit the broadcast signals to end user broadcast devices and transmit the cellular signals to end user cellular devices.

20. The system of claim 19, wherein the end user devices include:
mobile devices including one or more of smartphones, tablet computers, and laptop computers, and
fixed devices including one or more of Internet of Things (IOT) devices, televisions, desktop computers, and other fixed display devices.

* * * * *